Dec. 25, 1951 A. D. BURT 2,579,999

PHONOGRAPH TURNTABLE SPINDLE

Filed Nov. 23, 1946

Inventor

Alexander D. Burt

By

C D Truska

Attorney

Patented Dec. 25, 1951 2,579,999

UNITED STATES PATENT OFFICE 2,579,999

PHONOGRAPH TURNTABLE SPINDLE

Alexander D. Burt, Haddon Heights, N. J., assignor to Radio Corporation of America, a corporation of Delaware Application November 23, 1946, Serial No. 711,983

16 Claims. (Cl. 274—10)

Figure 1:
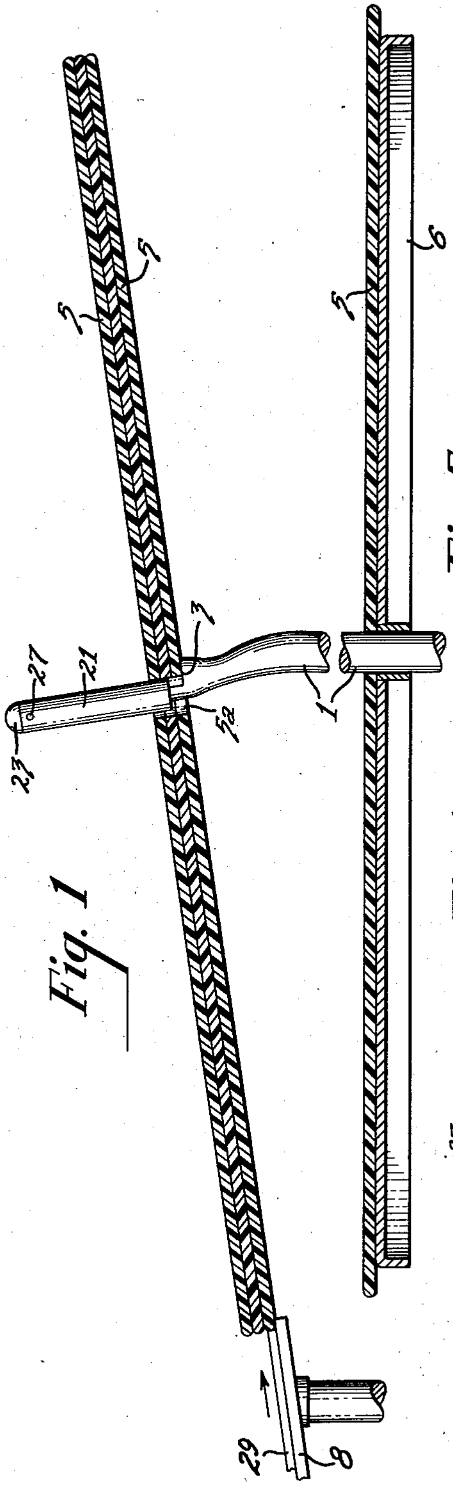

This invention relates to phonograph turntable spindles, and more particularly to spindles for those drop type automatic phonographs in which the unplayed records of a stack are supported adjacent their centers upon a shoulder on the spindle and adjacent their peripheries upon a supporting member at one side of the turntable.

In phonographs of this type, the spindles are arranged with a stack detaining member above the record supporting shoulder for holding back all of the records of the stack except the lowermost one while the lowermost record is being shifted laterally off of the supporting shoulder on the spindle to free it from the stack so that it can slide down along the spindle to the turntable. Since the stack detaining member is offset with respect to the body of the spindle, a problem is presented when the played records are to be removed from the turntable. As one solution for this problem, it has been proposed to make the spindle removable from the turn table so that, when the played records are to be removed, the spindle is first withdrawn, after which the records can be lifted freely. However, there are a number of objections to the use of a removable spindle. It has also been proposed to arrange the stack detaining member in a manner such that it will yield in response to pressure applied by the played records as they are raised from the turntable. As constructed heretofore, however, spindles of this type have not been found altogether suitable.

The primary object of my present invention is to provide an improved phonograph turntable spindle for the form of drop type phonographs indicated above which will be free from the objections found in similar, prior art spindles.

More particularly, it is an object of my present invention to provide an improved phonograph turntable spindle for drop type, automatic phonographs which may be mounted in a fixed position concentric with the turntable and which need not be removed to enable the ready removal of the played records.

Another object of my present invention is to provide an improved phonograph turntable spindle as aforesaid which will incorporate a detaining member for the unplayed records of the stack but which will, nevertheless, permit free and easy removal also of the played records along the entire length of the spindle notwithstanding such detaining member.

Still another object of my present invention is to provide an improved phonograph turntable spindle of the type set forth above which will permit easy and ready removal of played records from the turntable even though there may still be some unplayed records remaining in the stack, without first having to remove the latter records as is necessary in most prior art spindles of the type under consideration.

A further object of my present invention is to provide an improved phonograph turntable spindle as aforesaid which will not injure the records either during the transference thereof from the stack to the turntable or during removal thereof from the turntable.

Still a further object of my present invention is to provide an improved phonograph turntable spindle as aforesaid which is neat in appearance and which has the appearance of being made of a single, unitary part.

A still further object of my present invention is to provide an improved phonograph turntable spindle as above set forth which will not cause the records to catch or bind in any way either during discharge thereof from the stack to the turntable, or removal thereof from the turntable.

It is also an object of my present invention to provide an improved phonograph turntable spindle as above set forth which is very simple in construction, which can be easily fabricated, which is economical in cost, and which is highly efficient in use.

In accordance with my present invention, I form the spindle with a shank portion which is adapted to be mounted in fixed, concentric relation with the turntable and which is provided with a record supporting shoulder in which the lowermost record of a stack of unplayed records can rest. The spindle is also provided with a second portion which extends upwardly from the shank portion above the shoulder and in offset relation thereto. This upwardly extending portion of the spindle is formed with a longitudinal slot in which is slidably mounted a plate to which is secured a cylindrical sleeve having an outside diameter somewhat smaller than the diameter of the center holes of conventional disc records whereby this cylindrical sleeve presents a continuous, cylindrical surface to the record center hole. The aforementioned plate is formed with one or more guide slots which are angularly related to the spindle shoulder, and a guide pin extends through the slot in the upwardly extending portion of the spindle and the slot in the plate in a direction normal to these slots.

The tubular, cylindrical sleeve and its supporting plate may be termed the "head" of the spindle. Normally, this head occupies a position eccentric to the record supporting shoulder of the spindle and, in this position, its lower end is spaced from the spindle shoulder a distance somewhat greater than the thickness of a conventional disc record. Thus, the lowermost record of a stack of unplayed records threaded on the spindle head is free to be moved laterally off of the spindle shoulder in well known manner thereby to be released from the stack so that it can drop down along the spindle shank toward the turntable. The guide slots in the aforementioned plate are angularly related to the spindle shoulder and are so arranged that, when a record is raised from the turntable along the spindle shank into engagement with the lower end of the spindle head, the rising record will force the head upwardly and, by reason of the inclined slot or slots in the aforementioned plate, the head will be simultaneously forced over into a position concentric with the spindle shoulder. Thus, the rising record can be moved freely along the entire length of the spindle and can be removed therefrom without difficulty. This is true regardless of whether there are any unplayed records still remaining in the stack. If such be the case, the unplayed records are also shifted laterally as the spindle head is moved over from its eccentric position to its concentric position in relation to the spindle shoulder.

Figures 2, 3, 4, 5, 6, 7:
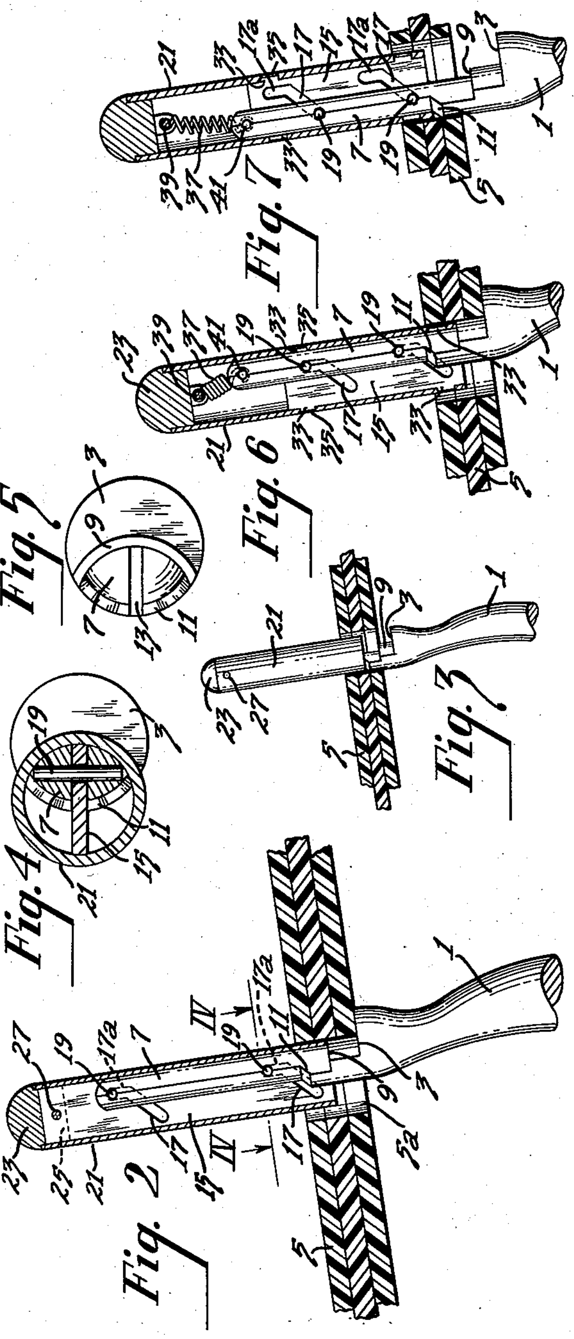

The novel features of my invention, as well as additional objects and advantages thereof, will better be understood from the following description of two embodiments thereof, when read in connection with the accompanying drawing in which Figure 1 is a side elevation, partly in section, of a phonograph embodying one form of spindle constructed in accordance with my present invention, Figure 2 is an enlarged view, partly in section, of the head portion of the spindle of Figure 1, Figure 3 is a fragmentary view similar to Figure 1 but showing the head of the spindle in the position which it assumes when records are being removed from the spindle, Figure 4 is a sectional view taken on the line IV—IV of Figure 2, Figure 5 is a top plan view of the spindle with the head removed, Figure 6 is a view corresponding to Figure 2 but showing another form of spindle in accordance with my present invention with the head in record detaining position, and Figure 7 is a view similar to Figure 6 but showing the spindle head in the position which it occupies when records are being removed from the spindle.

Referring more particularly to the drawing wherein similar reference characters designate corresponding parts throughout, there is shown a spindle having a shank portion 1 formed with a shoulder 3 on which the lowermost record of a stack of records 5 may rest. The spindle is also formed with an upwardly extending portion 7 which is offset relative to the shank portion 1 and which extends upwardly from the shoulder 3. The shank portion 1 is adapted to be arranged in a fixed or stationary position concentrically with a turntable 6 on which the records 5 rest during playing. The unplayed records of the stack are supported above the turntable 6 adjacent their center holes upon the spindle shoulder 3 and adjacent their peripheries by a suitable supporting member 8.

The spindle portion 7 is provided with a step 9 which constitutes a gauge, as will appear more clearly hereinafter, with an inclined shoulder 11, and with a longitudinal slot 13. Slidably mounted within the slot 13 is a plate 15 which is provided with one or more slots 17 inclined upwardly away from the spindle shoulder 3, as best seen from Figures 2, 6 and 7, the slots 17 terminating in vertical slot portions 17a. The spindle extension 7 carries a plurality of guide pins 19 corresponding in number to the number of slots 17, the pins 19 extending through the extension 7, including its slot 13, and their associated slots 17.

A tubular, preferably cylindrical sleeve 21 is mounted on the plate 15 and conceals the plate 15 from view, as is evident from Figures 1 and 3. The spindle extension 7 is, of course, also concealed within the tubular member 21. A cap 23 is fitted into the upper end of the sleeve 21 and is provided at its lower end with a transverse slot 25 in which the upper end of the plate 15 is received. A diametrically extending pin 27 locks the plate 15, the sleeve 21, and the cap 23 together into an integral unit.

The head of the spindle constituted by the sleeve 21, its cap 23 and the plate 15 normally occupies a relatively lower position, under the influence of gravity, in which it is eccentric to the shoulder 3 and in which the lower end of the sleeve 21 rests on the gauge step 9. This gauge step has a height which is just somewhat greater than the thickness of a conventional disk record but less than the thickness of two such records. Consequently, when a stack of records 5 is threaded on the spindle head, the lowermost record of the stack rests on the shoulder 3 and is free to be moved laterally off of the shoulder 3 by a suitable slide 29 on the support 8 when the slide is moved, in well known manner, in the direction of the appended arrow. The released record then becomes free to slide down along the spindle shank 1 onto the turntable 6 or onto the records which have previously dropped thereonto. The outside diameter of the sleeve 21 is preferably just slightly less than the diameter of the center holes 5a of standard records, and since the lower end of the sleeve 21 extends into the center hole of the second from the lowest record of the stack, as shown in Figure 2, it is apparent that all except the lowermost record will be detained by the spindle head while the lowermost record is being released. The cylindrical surface of the sleeve 21 presents a continuous, fully engaging surface for the record center holes, thereby greatly reducing danger of chipping or other damage to the records at their center holes. In practice, the outer diameter of the sleeve 21 is preferably of such dimension that the sleeve substantially fills the record center holes, the space between the center holes and the sleeve 21 being shown exaggerated somewhat in the drawings merely for the sake of clearness.

When it is desired to remove the played records from the turntable, it is merely necessary to raise them up along the shank portion 1 until the uppermost one of these records engages the lower end of the sleeve 21. Continued upward movement of the rising record then causes the spindle head first to be raised vertically somewhat as long as the vertical slot portions 17a are in engagement with the pins 19 and then, when the inclined portions of the slots 17 reach the pins 19, the head is moved laterally over to a position concentric with the shoulder 3, as shown in Figure 3, from its normally eccentric position of Figure 2. The inclined shoulder 11 may assist in this lateral movement of the spindle head. It is apparent, therefore, that the records can be removed freely along the entire length of the spindle without appreciable obstruction. As soon as the records have been removed the head will, of course, drop back down onto the gauge step 9 under the influence of gravity in the modification of Figures 1 to 5. The gauge step 9 can be machined accurately so that the required distance between the lower end of the sleeve 21 and the shoulder 3 can always be maintained.

In the modification of my invention shown in Figures 6 and 7, the plate 15 is formed with lateral projections 33 which are received in openings 35 in the sleeve 21. To fit the sleeve 21 onto the plate 15, the sleeve may be compressed somewhat into oval shape in cross section until its openings 35 are brought opposite the projections 33 whereupon pressure is removed from the sleeve to permit it spring back into its original shape. In this way, the sleeve 21 becomes locked to the plate 15. The cap 23 is force fit into the top of the sleeve 21, and a tension spring 37 is connected at one end to a pin 39 on the cap 23 and at its other end to a pin 41 on the upper end of the spindle extension 7. Thus, reliance may not only be had upon gravity but also upon the spring 37 to bias the spindle head to and hold it in its lower, normal, eccentric position on the gauge step 9, as seen from Figure 6. When the played records are brought into engagement with the lower end of the spindle head during removal thereof, these records will force the head upwardly and laterally to its raised, concentric position relative to the shoulder 3, as shown in Figure 7, against the action of the spring 37. As soon as the records have been removed from the spindle head, the spring 37 will pull the head back down into its eccentric position of Figure 6.

From the foregoing description, it will undoubtedly be apparent to those skilled in the art that I have provided an improved spindle for drop type record changers which is free from many objections found in similar, prior art spindles. Although I have shown and described two embodiments of my present invention, it will undoubtedly be apparent to those skilled in the art that many other modifications thereof, as well as variations in those described above, are possible. I therefore desire that the foregoing shall be considered merely as illustrative and not as limiting.

I claim as my invention:

1. A turntable spindle for automatic phonographs which comprises a shank adapted to be mounted in concentric relation with a turntable and having a shoulder thereon, an extension beyond said shoulder, a head receiving said extension being movable laterally to and longitudinally along said extension, said head terminating at a point spaced from said shoulder a distance somewhat greater than the thickness of a record to be played, and cooperative means in said extension and said head for guiding said head laterally to and longitudinally along said extension to and from a first position nearest said shoulder eccentric thereto and a second position farthest from said shoulder concentric therewith, said head being of suitable length to receive a stack of unplayed records, an end one of which records may rest against said shoulder when said head is in said first position and which may be moved laterally off said shoulder to slide along said shank while said head prevents lateral movement of the other records of the stack, said cooperative means permitting said head to be moved to said second position when a record to be removed engages said head, whereby movement of such record along the entire length of said spindle for removal thereof from said spindle is accomplished.

2. A turntable spindle according to claim 1 characterized in that said head comprises a cylindrical member.

3. A turntable spindle according to claim 1 characterized in that said head includes a member having a cylindrical surface which is presented to the records of said stack at their respective center holes.

4. A turntable spindle according to claim 1 characterized in that said extension includes means for gauging said distance between said shoulder and the adjacent end of said head when said head is in its said first position.

5. A turntable spindle for automatic phonographs which comprises a shank portion adapted to be mounted in concentric relation with the turntable, said shank portion having a record supporting shoulder thereon, a second portion extending upwardly from said shank portion above said shoulder, a substantially hollow head receiving said second portion, whereby said head is capable of movement laterally and longitudinally with respect to said second portion, and cooperating means in said head and said second portion for guiding said head to and from a first position eccentric to said shoulder and a second position concentric therewith, said head being normally biased to said first position and being adapted to receive a stack of unplayed records the lowermost one of which may rest on said shoulder when said head is in said first position, and means spacing the lower end of said head from said shoulder a distance somewhat greater than the thickness of a record when said head is in said first position whereby said lowermost record is free to be moved laterally off of said shoulder to enable it to slide down along said shank portion toward said turntable while said head prevents lateral movement of the remaining records of the stack, and said head being movable to said second position when engaged by a record raised along said shank portion into engagement therewith to thereby permit movement of said last named record along the entire length of said spindle for removal thereof from said spindle.

6. A turntable spindle according to claim 5 characterized in that said head includes a tubular member having a cylindrical outer surface which is presented to the records of said stack at their respective center holes.

7. A turntable spindle according to claim 5 characterized in that said head includes a tubular member having a cylindrical outer surface which is presented to the records of said stack at their respective center holes, and characterized further in that the outer diameter of said tubular member is of such dimension that said member substantially fills said center holes.

8. A turntable spindle according to claim 5 characterized by the addition of spring means connecting said second spindle portion and said head, said spring means normally holding said head in its said first position.

9. A turntable spindle for automatic phonographs which comprises a shank portion adapted to be mounted in concentric relation with the turntable, said shank portion having a record supporting shoulder thereon, a second portion extending upwardly from said shank portion above said shoulder and having a longitudinal slot therein, and a head movably mounted on said second portion for longitudinal movement along said second portion to and from a first position eccentric to said shoulder and a second position concentric therewith, said head comprising a plate slidably carried in said slot and a tubular sleeve secured to said plate, said head being normally biased to said first position and being adapted to receive a stack of unplayed records the lowermost one of which may rest on said shoulder when said head is in said first position, said sleeve having a cylindrical surface which is presented to the records of said stack at their respective center holes, means spacing the lower end of said head from said shoulder a distance somewhat greater than the thickness of a record when said head is in said first position whereby said lowermost record is free to be moved laterally off of said shoulder to enable it to slide down along said shank portion toward said turntable while said head prevents lateral movement of the remaining records of the stack, and said head being movable to said second position when engaged by a record raised along said shank portion into engagement therewith to thereby permit movement of said last named record along the entire length of said spindle for removal thereof from said spindle.

10. A turntable spindle for automatic phonographs which comprises a shank portion adapted to be mounted in concentric relation with the turntable, said shank portion having a record supporting shoulder thereon, a second portion extending upwardly from said shank portion above said shoulder and having a longitudinal slot therein, and a head movably mounted on said second portion for longitudinal movement along said second portion to and from a first position eccentric from said shoulder and a second position concentric therewith, said head comprising a plate slidably carried in said slot and a tubular sleeve secured to said plate, said plate having a guide slot therein in register with said first named slot, and a guide pin on said second spindle portion which extends through both said slots for guiding the movement of said head from one to the other of its said first and second positions, said head being normally biased to said first position being adapted to receive a stack of unplayed records the lowermost one of which may rest on said shoulder when said head is in said first position, means spacing the lower end of said head from said shoulder a distance somewhat greater than the thickness of a record when said head is in said first position whereby said lowermost record is free to be moved laterally off of said shoulder to enable it to slide down along said shank portion toward said turntable while said head prevents lateral movement of the remaining records of the stack, and said head being movable to said second position when engaged by a record raised along said shank portion into engagement therewith to thereby permit movement of said last named record along the entire length of said spindle for removal thereof from said spindle.

11. A turntable spindle for automatic phonographs which comprises a shank portion adapted to be mounted in concentric relation with the turntable, said shank portion having a record supporting shoulder thereon, a second portion extending upwardly from said shank portion above said shoulder and having a longitudinal slot therein, and a head movably mounted on said second portion for longitudinal movement along said second portion to and from a first position eccentric from said shoulder and a second position concentric therewith, said head comprising a plate slidably carried in said slot and a tubular sleeve secured to said plate, said plate having a guide slot therein in register with said first named slot, a guide pin on said second portion which extends through both said slots for guiding the movement of said head from one to the other of its first and second positions, said head being normally biased to said first position and being adapted to receive a stack of unplayed records the lowermost one of which may rest on said shoulder when said head is in said first position, means spacing the lower end of said head from said shoulder a distance somewhat greater than the thickness of a record when said head is in said first position whereby said lowermost record is free to be moved laterally off of said shoulder to enable it to slide down along said shank portion toward said turntable while said head prevents lateral movement of the remaining records of the stack, a portion of said guide slot being inclined relative to said shoulder in a direction such that, when said head is engaged by the record raised along said shank portion, said guide slot and said guide pin will cooperate to permit said head to be raised relative to said shoulder while simultaneously causing said head to move from its said first position to its said second position in response to the raised record whereby to clear the path for said record and permit movement thereof along the entire length of said spindle for removal of the raised record from said spindle.

12. A turntable spindle for an automatic phonograph which comprises a shank adapted to be mounted in concentric relation with the turntable, said shank having a shoulder thereon adapted to support a stack of records and normally engage the lowermost record of said stack, an extension beyond said shoulder, a substantially hollow head receiving said extension, whereby said head is movable laterally to and longitudinally along said extension, said head being adapted to normally align and retain a stack of records, except the lowermost record of said stack, eccentric with said shoulder, said head terminating at a point spaced from said shoulder a distance somewhat greater than the thickness of a record, whereby the lowermost record may be moved laterally off of said shoulder to enable it to slide uninterruptedly along said shank toward said turntable while said head prevents lateral movement of the remaining records of the stack, and cooperative means in said extension and said head to guide said head from a first position eccentric to said shoulder to a second position concentric therewith when engaged by a record moved along said shank into engagement therewith to thereby permit movement of said lowermost record along the entire length of said spindle for removal thereof from said spindle, and said cooperative means permitting said head to return to its position eccentric with said shoulder after removal of a record.

13. A turntable spindle for automatic phonographs which comprises a shank adapted to be mounted in concentric relation with the turntable, said shank having a shoulder thereon adapted to engage the lowermost record of a stack of records, an extension beyond said shoulder having a longitudinal slot therein, a head receiving said extension, said head being substantially hollow whereby said head is movable laterally and longitudinally with respect to said extension, said head being adapted to receive said stack of unplayed records an end one of which may rest against said shoulder when said head is in said lower stationary position, an internal portion of said head being slidable in said slot, cooperative means in said internal portion and said extension for spacially disposing said head from said shoulder a distance somewhat greater than the thickness of a record whereby said end record may be moved laterally off of said shoulder to enable it to slide along said shank toward said turntable while said head prevents lateral movement of the remaining records of the stack, and said cooperative means permitting said head to be moved to said upper position when engaged by a record moved along said shank into engagement therewith to thereby permit movement of said last named record along the entire length of said spindle for removal thereof from said spindle.

14. A turntable spindle for an automatic phonograph which comprises a shank adapted to be mounted in concentric relation with the turntable, said shank having a shoulder thereon adapted to support a stack of records and normally engage the lowermost record of said stack, an extension beyond said shoulder having a longitudinal slot therein, and a head mounted on said extension and adapted for longitudinal and lateral movement in said slot, said head comprising an internal portion slidable in said slot and including an outer tubular member having a cylindrical outer surface which is presented to the records of said stack at their respective center holes, the outer diameter of said tubular member being of such dimension as to substantially fill said center holes, cooperative means in said internal portion and said extension permitting said head to normally align and retain a stack of records in a position eccentric to said shoulder, said head terminating at a point spaced from said shoulder a distance somewhat greater than the thickness of a record, whereby said lowermost record may be moved laterally off of said shoulder to enable it to slide uninterruptedly along said shank toward said turntable while said tubular member of said head prevents lateral movement of the remaining records of the stack.

15. A turntable spindle for an automatic phonograph which comprises a shank adapted to be mounted in concentric relation with the turntable, said shank having a shoulder thereon adapted to support a stack of records and normally engage the lowermost record of said stack, an extension having a longitudinal slot therein beyond said shoulder, and a head mounted on said extension and adapted to normally align and retain a stack of records, except the lowermost record of said stack, eccentric with said shoulder, said head terminating at a point spaced from said shoulder a distance somewhat greater than the thickness of a record, whereby said lowermost record may be moved laterally off of said shoulder to enable it to slide uninterruptedly along said shank toward said turntable while said head prevents lateral movement of the remaining records of the stack, said head comprising a plate slidably carried in said extension slot, and a sleeve having a cylindrical surface which is presented to the records of said stack at their respective center holes carried by said plate.

16. A turntable spindle for an automatic phonograph which comprises a shank adapted to be mounted in concentric relation with the turntable, said shank having a shoulder thereon adapted to engage the lowermost record of a stack of unplayed records, an extension beyond said shoulder having a longitudinal slot therein, a movable head comprising a substantially hollow external portion surrounding said extension and having an internal portion movable longitudinally and laterally in said slot disposed in the said slot of said extension to maintain said head in a predetermined position eccentric to said shoulder throughout the automatic playing operation, said external portion of said head being adapted to receive and align said stack of unplayed records, an end one of which may rest against said shoulder between successive lowering movement of said records, and cooperative guide means in said internal portion and said extension to permit controlled movement of said head laterally to and longitudinally along said extension to a position concentric with said shoulder when engaged by a record moved along said shank into engagement therewith to permit movement of said last named record along the entire length of said spindle for removal thereof from said spindle.

ALEXANDER D. BURT.

REFERENCES CITED

The following references are of record in the file of this patent:

UNITED STATES PATENTS

| Number | Name | Date |
|---|---|---|
| 2,328,052 | Butler | Aug. 31, 1943 |
| 2,355,790 | Faulkner | Aug. 15, 1944 |
| 2,457,106 | Pressley | Dec. 21, 1948 |

FOREIGN PATENTS

| Number | Country | Date |
|---|---|---|
| 70,851 | Norway | Aug. 12, 1946 |